United States Patent Office 2,715,066
Patented Aug. 9, 1955

2,715,066

AIR CURING OF SHEET MATERIAL CONTAINING SYNTHETIC ELASTOMERS

David A. Feigley, Jr., Manheim Township, Lancaster County, Pa., assignor to Armstrong Cork Company, Lancaster, Pa., a corporation of Pennsylvania No Drawing. Application December 14, 1951, Serial No. 261,743

7 Claims. (Cl. 92—21)

This invention relates to the production of sheet materials from compositions containing synthetic elastomers. More particularly, the invention relates to a method of producting a sheet material from a composition containing synthetic elastomers in which the elastomer is dispersed over a mass of filler material, which may be any suitable material in fine particle size, and warm air is circulated over the sheet material, thereby curing the product to one which is resilient and flexible and capable of a wide variety of uses.

Synthetic elastomers have been cured in air for some time. However, it has been exceedingly difficult to obtain air cured synthetic elastomer products meeting certain specifications. For example, there are numerous uses for sheet materials made from synthetic elastomers which require a certain amount of uniformity of the sheets, coupled with resilience and flexibility. For example, in the production of hard surface floor covering from synthetic rubber or other elastomeric materials, it is essential that the product be resilient and flexible, and yet it is highly undesirable to have a material which is exceedingly hard at the surface but which possesses a soft center. Soft-centered materials are undesirable because they cannot withstand the normal loads placed upon them, such as furniture and other objects. It is also desirable in the production of gasket material from fibers and a binder of synthetic elastomer to have a product which is uniformly cured and thereby able to meet rigid specifications placed upon such materials. For example, gasket materials must be capable of sealing against leakage of various fluids and, in addition, be of such resiliency and compressibility as to overcome minor variations in the surfaces to be sealed.

I have found that selected synthetic elastomers may be compounded with small amounts of selected antioxidants, dispersed over the finely divided filler material, and cured in air at elevated temperature to produce sheet materials possessing very desirable properties.

The elastomers employed in the practice of my invention are those which are rubberlike polymers which possess residual double bonds after polymerization. Examples of such materials are butadiene-styrene copolymers and butadiene-acrylonitrile copolymers. Such rubberlike polymers are well known in the art and are generally produced by copolymerizing in aqueous emulsion butadiene and styrene or acrylonitrile. Generally speaking, in order to obtain rubberlike properties, the butadiene is present in major amounts, such as 50% and more by weight of the polymerizable material present. Typical copolymers which may be employed in the practice of my invention are a butadiene-styrene copolymer containing about 50% butadiene and about 50% styrene, and a butadiene-acrylonitrile copolymer containing about 60% butadiene and about 40% acrylonitrile. It is to be understood that the particular ratio of butadiene and styrene or acrylonitrile used to produce the rubberlike binder materials employed in the practice of my invention is not a part of this invention but is well known in the art. Thus, when I employ the term "rubberlike polymers," I intend to include the well-known butadiene polymers of the synthetic rubber art.

To obtain the desired air cure in the practice of my invention, it is advantageous to employ selected amounts of the phenol-amine salt. Generally speaking, the desired cure is obtained when about 0.25% to 1.25%, based on the weight of the rubberlike copolymer, is employed.

In accordance with my invention, the synthetic elastomer containing the desired amount of selected antioxidant is first compounded. The rubber and antioxidant compound is then dispersed upon a body of finely divided filler particles. These particles may be finely divided solids, such as wood flour, silica gel, and the like, or they may be fibrous materials, such as paper fibers, asbestos fibers, cotton linters, and the like. In forming the mass of rubberlike polymer and finely divided material which is to be air cured, it is important to produce a material of sufficient porosity to enable air to be passed through the mass during the curing cycle. Generally speaking, excellent results are obtained by employing a minimum of 100 parts by weight of fibrous filler material per 100 parts by weight of rubberlike copolymer. When smaller amounts of filler are employed, the curing time is quite long.

The mass of rubber, filler, and antioxidant is then formed into a sheet by a suitable means and thereafter subjected to curing in air at elevated temperatures. Generally speaking, the temperature of cure should not exceed about 250° F., because at such temperatures the stocks blister and harden. Particularly advantageous results have been obtained by curing the mass at temperatures between about 185° and 225° F.

In one embodiment of my invention, which is particularly desirable when fibrous fillers or mixtures of fibrous filler and finely divided solid fillers are used, a slurry of fibers is first formed and thereafter treated with a soluble salt of a polyvalent metal such as aluminum chloride, aluminum sulfate, and the like. To the resulting slurry is added an alkaline hydroxide solution such as sodium hydroxide, ammonium hydroxide, and the like to convert the soluble salt to the relatively insoluble metal hydroxide, for example aluminum hydroxide. Following this conversion step, the synthetic rubber latex containing the desired amounts of selected antioxidant is added to the slurry and, after agitation, the synthetic rubber and antioxidant are deposited on the fibers. The resulting slurry of coated fibers is then formed into a sheet on conventional paper-making equipment, and the sheets stoved or cured as indicated above.

In another embodiment of my invention, which may be advantageously practiced when the filler material is a finely divided solid such as wood flour, the synthetic rubber and antioxidant are compounded by adding the antioxidant to the synthetic rubber latex and coagulating the resulting latex by conventional means such as by the addition of acetic acid. The resulting coagulum is then dried and placed on a rubber mill. The wood flour is added and the resulting mixture milled until uniform dispersion of the rubber and antioxidant over the filler particles is obtained. The time for complete dispersion may vary and generally the mass is removed from the mill when the skill of the operator indicates the desired dispersion is obtained. Generally speaking, I have found it difficult to incorporate more than 200 parts by weight of filler per 100 parts by weight of synthetic rubber when mill mixing is employed.

To produce a flooring material, the mass of filler, rubber, and antioxidant is generally subdivided into fine particles, deposited upon a backing, calendered or otherwise formed into a smooth surfaced sheet, and stoved or cured as indicated above.

The following specific examples are illustrative of my invention:

Example I 100 parts by weight of kraft fibers were suspended in 10,000 parts by weight of water. To the resulting slurry were added 12 parts by weight of $Al_2(SO_4)_3.18H_2O$ in solution form, and the resulting slurry was agitated to disperse the solution. 10.8 parts by weight of $(NH_4)OH$ (28%) were then added to convert the $Al_2(SO_4)_3.H_2O$ to $Al(OH)_3$. 25 parts by weight of a butadiene-styrene copolymer with a butadiene content of about 50% in the form of a latex and .06 part by weight of the di-ortho-tolyl-guanidine salt of di-catechol-borate were then added. The resulting slurry was agitated to coagulate the copolymer and antioxidant onto the fibers. The slurry of coated fibers was formed into a sheet on a paper machine. The sheet was cured in air at about 200° F. for 10 days.

Example II

To 100 parts by weight of a butadiene-styrene copolymer with a butadiene content of about 50% in latex form were added 2 parts by weight of the di-ortho-tolyl-guanidine salt of di-catechol-borate. The resulting mixture was coagulated with acetic acid with the coagulum containing copolymer and antioxidant dried. The dried coagulum was placed on a rubber mill and after milling the same for a short time, 100 parts by weight of wood flour were added. The milling was continued until uniform dispersion was obtained. The resulting product was subdivided and calendered onto a sheet of saturated felt. The calendered sheet was cured in air at 185° F. to 225° F. for 10 days to give a resilient floor covering.

It is within the scope of my invention to produce floor coverings by applying a mass of filler and rubberlike polymer containing antioxidants to a suitable backing and curing the resulting product in conventional stoves for temperatures and time as indicated above. It is also within the scope of my invention to produce backing material for floor covering by coating fibers contained in a slurry, by coagulating a butadiene-styrene copolymer latex onto the fibers, forming the fibers into a sheet, and drying to produce the desired product. Because of the presence of the selected antioxidants in the rubber bonded sheet material, conventional linoleum mix may be applied thereto, and the linoleum product may be cured in conventional stoves so that the final product possesses the desired flexibility.

It is also within the scope of my invention to produce a gasket material by beater saturation process which contains kraft fibers bonded by synthetic rubber containing selected antioxidants within the proportions specified. The resulting product may be air cured to produce a sheet of gasket material having highly desirable properties.

In the practice of my invention, the stoving or curing is advantageously conducted in the absence of sulfur or other conventional vulcanizing agents. The presence of sulfur offers no advantage and in some cases may be detrimental. For instance, the presence of sulfur may limit the number of pigments which can be included in the composition. Thus, a sulfur-free composition permits the use of a wide variety of pigments. This is especially advantageous in the production of floor coverings where color and design are important considerations.

I claim:

1. A method of producing sheet material containing rubberlike polymers and possessing uniform characteristics including resilience and flexibility, which comprises admixing di-ortho-tolyl-guanidine salt of di-catechol-borate with a rubberlike butadiene polymer which possesses residual double bonds after polymerization, dispersing the resulting material over a finely divided filler in such a manner as to provide a porous mass through which air may pass, and heating the resulting material in air at an elevated temperature.

2. A method of hardening synthetic elastomers comprising incorporating into a synthetic elastomer produced by copolymerization of butadiene and styrene a small but effective amount of a di-ortho-tolyl-guanidine salt of di-catechol-borate, dispersing the resulting mass over a body of finely divided filler particles in such a manner as to provide a porous mass through which air may be passed at elevated temperature, and passing air through said mass at a temperature of about 185° F. to about 225° F. until a resilient and flexible product is obtained.

3. A method of producing saturated felt possessing properties which enable its use as a backing for floor covering which comprises forming a slurry of fibrous material and depositing the solid contents of a rubberlike butadiene polymer latex to which has been added a small but effective amount of a di-ortho-tolyl-guanidine salt of di-catechol-borate onto said fibers within said slurry, forming the resulting slurry into a sheet, and curing the resulting sheet by heating the same in air at elevated temperature.

4. A method of producing a resilient hard surface floor covering comprising coagulating a synthetic rubber latex containing a butadiene polymer and a di-ortho-tolyl-guanidine salt of di-catechol-borate, milling into said coagulum a finely divided filler, subdividing the resulting material, depositing said subdivided material onto a backing, forming the resulting product into a smooth surface sheet, and stoving said sheet in air at elevated temperature.

5. A method of producing sheet material containing rubberlike polymers and possessing uniform characteristics including resilience and flexibility, which comprises admixing with a rubberlike butadiene polymer which possesses residual double bonds after polymerization about 0.25% to 1.25% by weight thereof of a di-ortho-tolyl-guanidine salt of di-catechol-borate, dispersing the resulting material over a finely divided filler in such a manner as to produce a porous mass through which air may pass, and heating the resulting material in air at an elevated temperature.

6. A method of producing sheet material containing rubberlike polymers and possessing uniform characteristics including resilience and flexibility, which comprises admixing a di-ortho-tolyl-guanidine salt of di-catechol-borate with a rubberlike copolymer of butadiene and styrene, dispersing the resulting material over a finely divided filler in such a manner as to provide a porous mass through which air may pass, and heating the resulting material in air at elevated temperature.

7. A method of producing sheet material containing rubberlike polymers and possessing uniform characteristics including resilience and flexibility, which comprises admixing a di-ortho-tolyl-guanidine salt of di-catechol-borate with a rubberlike copolymer of butadiene and acrylonitrile, dispersing the resulting material over a finely divided filler in such a manner as to provide a porous mass through which air may pass, and heating the resulting material in air at an elevated temperature.

References Cited in the file of this patent

UNITED STATES PATENTS

| | | |
|---|---|---|
| 1,912,671 | Van Horn | June 6, 1933 |
| 2,565,998 | Swaney | Aug. 28, 1951 |
| 2,613,190 | Feigley | Oct. 7, 1952 |